US012564814B2

(12) United States Patent
Nakashima et al.

(10) Patent No.: US 12,564,814 B2
(45) Date of Patent: Mar. 3, 2026

(54) HOLLOW-FIBER MEMBRANE MODULE UNIT

(71) Applicant: TORAY INDUSTRIES, INC., Tokyo (JP)

(72) Inventors: Naoki Nakashima, Shiga (JP); Michitaka Higaki, Shiga (JP); Ryo Ichimura, Shiga (JP); Kohei Fujii, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 18/683,377

(22) PCT Filed: Aug. 18, 2022

(86) PCT No.: PCT/JP2022/031281
§ 371 (c)(1),
(2) Date: Feb. 13, 2024

(87) PCT Pub. No.: WO2023/022208
PCT Pub. Date: Feb. 23, 2023

(65) Prior Publication Data
US 2024/0325980 A1     Oct. 3, 2024

(30) Foreign Application Priority Data
Aug. 20, 2021     (JP) ................................. 2021-134671

(51) Int. Cl.
B01D 63/04          (2006.01)

(52) U.S. Cl.
CPC ...... B01D 63/046 (2013.01); B01D 2313/105 (2013.01); B01D 2313/125 (2013.01); B01D 2317/04 (2013.01)

(58) Field of Classification Search
CPC ............ B01D 63/046; B01D 2313/105; B01D 2313/125; B01D 2317/04; B01D 65/02;
(Continued)

(56) References Cited

U.S. PATENT DOCUMENTS 6,142,536 A   *  11/2000   Wolfsdorf ............. F16L 17/032
                                                                      285/308
7,712,796 B2 *   5/2010   Gibb ....................... F16L 17/04
(Continued)

FOREIGN PATENT DOCUMENTS

AU          2013200624 A1       2/2014
AU          2013101711 A4       2/2015
(Continued)

OTHER PUBLICATIONS

English language machine translation of JP2012145182, No Date.*
(Continued)

*Primary Examiner* — Pranav N Patel
(74) *Attorney, Agent, or Firm* — Birch, Stewart, Kolasch & Birch, LLP

(57)          ABSTRACT

The present invention relates to a hollow fiber membrane module unit including a plurality of hollow fiber membrane elements to which header pipe caps are attached at both end portions, the hollow fiber membrane elements being arranged in parallel to form a row, in which the adjacent header pipe caps attached to the hollow fiber membrane elements on a permeate side are connected by a side seal connection covering an outer periphery of a contact surface, and the header pipe caps at at least both ends of the row are fixed by a support bar.

8 Claims, 6 Drawing Sheets

(58) Field of Classification Search

CPC .......... B01D 2313/02; B01D 2313/025; B01D 2313/21; B01D 2313/54; B01D 2321/04; B01D 2321/16; B01D 63/043; B01D 69/08; A01K 63/04

See application file for complete search history.

(56) References Cited

U.S. PATENT DOCUMENTS

| | | | | |
|---|---|---|---|---|
| 2003/0038075 A1* | 2/2003 | Akimoto | ................ | B01D 63/02 210/321.89 |
| 2010/0289257 A1* | 11/2010 | Madara | .................... | F16L 17/04 285/24 |
| 2013/0185919 A1* | 7/2013 | Beagen, Jr. | ........... | F16L 17/025 285/337 |
| 2013/0187345 A1* | 7/2013 | Beagen, Jr. | ............. | F16L 17/04 277/626 |
| 2014/0231367 A1* | 8/2014 | Biltoft | .................... | B01D 35/34 210/454 |
| 2016/0228822 A1 | 8/2016 | Cao et al. | | |
| 2017/0151533 A1 | 6/2017 | Biltoft et al. | | |
| 2019/0374888 A1 | 12/2019 | Biltoft et al. | | |
| 2020/0238216 A1 | 7/2020 | Selzer et al. | | |
| 2022/0288537 A1* | 9/2022 | Kim | .................... | B01D 63/046 |

FOREIGN PATENT DOCUMENTS

| | | | | |
|---|---|---|---|---|
| CA | 2 850 309 | C | | 1/2020 |
| CN | 101301585 | A | | 11/2008 |
| CN | 201997263 | U | | 10/2011 |
| CN | 202597988 | U | | 12/2012 |
| CN | 103224269 | A | | 7/2013 |
| CN | 206645872 | U | | 11/2017 |
| CN | 210522273 | U | | 5/2020 |
| EP | 1743690 | B1 | | 12/2008 |
| ES | 2 318 679 | T3 | | 5/2009 |
| JP | 11-9969 | A | | 1/1999 |
| JP | 2009-28716 | A | | 2/2009 |
| JP | 2012066180 | A | * | 4/2012 |
| JP | 2012145182 | A | * | 8/2012 |
| JP | 2013-52386 | A | | 3/2013 |
| JP | 2014-528352 | A | | 10/2014 |
| JP | 2021-500219 | A | | 1/2021 |
| WO | WO 2006/012920 | A1 | | 2/2006 |

OTHER PUBLICATIONS

English language machine translation of JP201266180, 13 pages, No Date.*

T-Rack 3.0 Innovative rack solution for ultrafiltration brochure, pp. 1-10, 2015. (Year: 2015).*

English language machine translation of JP 2012-145182A, 9 pages, No Date.*

International Search Report, issued in PCT/JP2022/031281, PCT/ISA/210, dated Oct. 25, 2022.

JP-Written description of circumstances for accelerated examination 2022-551004 on Feb. 15, 2023.

Notification of Reasons for Refusal for Japanese Application No. 2022-551004, dated May 16, 2023.

Written Opinion of the International Searching Authority, issued in PCT/JP2022/031281, PCT/ISA/237, dated Oct. 25, 2022.

Korean Office Action for Korean Application No. 10-2024-7004568, dated Aug. 29, 2024, with an English translation.

Chinese Office Action for Chinese Application No. 202280056539.1, dated Sep. 19, 2024, with an English translation.

Chinese Office Action and Search Report for Chinese Application No. 202280056539.1, dated May 14, 2024, with English translation.

Kentish et al., "Industrial Pipeline Engineering," China Petrochemical Press, 1991, p. 175 (7 pages total).

Lu, "American Building Water Supply and Drainage Design," Economic Daily Press, 2007, p. 69 (8 pages total).

Chinese Office Action in Chinese Application No. 202280056539.1, mailed Dec. 3, 2024, with English translation.

Extended European Search Report for European Application No. 22858525.3, dated Nov. 4, 2024.

Inge: "Technical Manual Ultrafiltration," XP093206521, Feb. 28, 2010, pp. 1-40.

Inge: "T-Rack 3.0 Integrated rack solutions for ultrafiltration," XP093206517, Feb. 28, 2017, pp. 1-10.

European Communication pursuant to Article 94(3) EPC for European Application No. 22 858 525.3, dated May 8, 2025.

Inge, "dizzer XL 0.9 MB 70 WT for T-Rack 3.0," Lenntech Water Treatment Solutions, XP093271980, Feb. 28, 2020, pp. 1-2.

European Communication pursuant to Article 94(3) EPC for European Application No. 22 858 525.3, dated Nov. 11, 2025.

Wan et al., "Seven-bore hollow fiber membrane (HFM) for ultrafiltration (UF)," Chemical Engineering Research and Design, vol. 128, 2017, pp. 240-247.

* cited by examiner

HOLLOW-FIBER MEMBRANE MODULE UNIT

TECHNICAL FIELD

The present invention relates to a hollow fiber membrane module unit including a plurality of hollow fiber membrane modules.

BACKGROUND ART

A pressurized type hollow fiber membrane module has advantages of energy saving and space saving, and thus is widely used in various fields. For example, Patent Literatures 1 and 2 propose a method for saving installation space, and Patent Literature 2 discloses a structure of a hollow fiber membrane module unit in which a plurality of hollow fiber membrane modules are stored in a unit rack and a module cap and a header pipe are connected via a flexible hose.

Meanwhile, Patent Literature 3 discloses a structure of a hollow fiber membrane module unit in which a header pipe cap obtained by integrating a module cap and a header pipe is used. In addition, a method for connecting a hollow fiber membrane module and the header pipe cap and a method for reducing an axial force applied to a connection portion are described.

CITATION LIST

Patent Literature

Patent Literature 1: JP2013-52386A
Patent Literature 2: JP2009-28716A
Patent Literature 3: European Patent Specification Number 1743690

SUMMARY OF INVENTION

Technical Problem

However, Patent Literature 3 does not provide a method for connecting the header pipe caps or a method for reducing an axial force applied to a connection portion between header pipe caps.

An object of the present invention is to provide a hollow fiber membrane module unit capable of achieving allowing a dimension error of a member and ensuring ease of assembly, and preventing displacement, deformation, and damage of a header pipe cap caused by an axial force applied to a connection portion between the header pipe caps.

Solution to Problem

In order to solve the above problems, the present invention has the following configuration.

(1) A hollow fiber membrane module unit including a plurality of hollow fiber membrane elements to which header pipe caps are attached at both end portions, the hollow fiber membrane elements being arranged in parallel to form a row, in which the adjacent header pipe caps attached to the hollow fiber membrane elements on a permeate side are connected by a side seal connection covering an outer periphery of a contact surface, and the header pipe caps at at least both ends of the row are fixed by a support bar.

(2) The hollow fiber membrane module unit according to (1), in which the adjacent header pipe caps are connected by the side seal connection covering the outer periphery of the contact surface and a connection by the support bar.

(3) The hollow fiber membrane module unit according to (1) or (2), in which the side seal connection is a groove type connection in which a groove is provided in an outer peripheral portion of a connection portion of the header pipe cap.

(4) The hollow fiber membrane module unit according to any one of (1) to (3), in which the support bar is positioned on an opposite side of the hollow fiber membrane element via the header pipe cap.

(5) The hollow fiber membrane module unit according to any one of (1) to (4), in which the support bar is attached in two rows to the header pipe cap.

Advantageous Effects of Invention

In the hollow fiber membrane module unit according to the present invention, when the header pipe cap in which a module cap and a header pipe are integrated is used, by connecting the header pipe caps by the side seal connection covering the outer periphery of the contact surface and a connection by the support bar, a dimension error of each member constituting the hollow fiber membrane module unit can be allowed, and displacement and deformation acting on the header pipe cap can be prevented while ensuring ease of assembly.

BRIEF DESCRIPTION OF DRAWINGS

FIG. 1A and FIG. 1B illustrate one embodiment of a hollow fiber membrane module unit according to the present invention. FIG. 1A is a schematic perspective view, and FIG. 1B is a schematic perspective view.

FIG. 4A and FIG. 4B illustrate one embodiment of a connection method of the header pipe caps used in the present invention. FIG. 4A is a schematic perspective view, and FIG. 4B is a schematic cross-sectional view.

DESCRIPTION OF EMBODIMENTS

Figure 2:
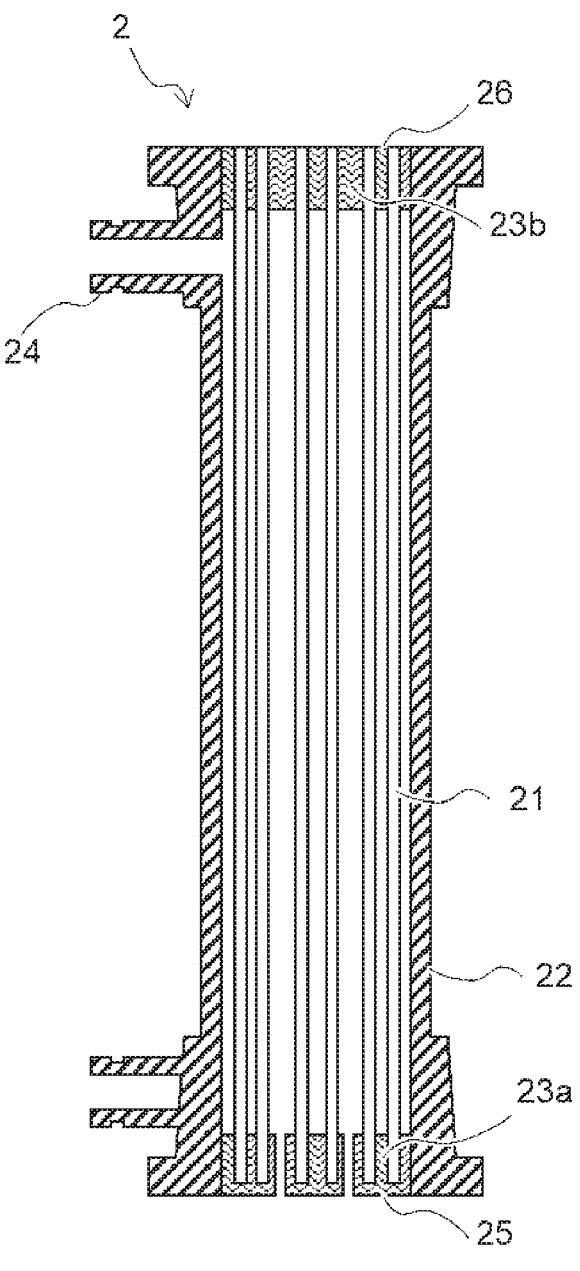
FIG. 2 is a schematic cross-sectional view illustrating one embodiment of a hollow fiber membrane element used in the present invention.

A hollow fiber membrane module unit according to the present invention includes a plurality of hollow fiber membrane elements to which header pipe caps are attached at both end portions, the hollow fiber membrane elements being arranged in parallel to form a row, in which the adjacent header pipe caps attached on a permeate side of the hollow fiber membrane elements are connected by a side seal connection covering an outer periphery of a contact surface, and the header pipe caps at at least both ends of the row are fixed by a support bar.

The hollow fiber membrane module unit according to the present invention will be described below with reference to the drawings.

Figures 1A, 1B:
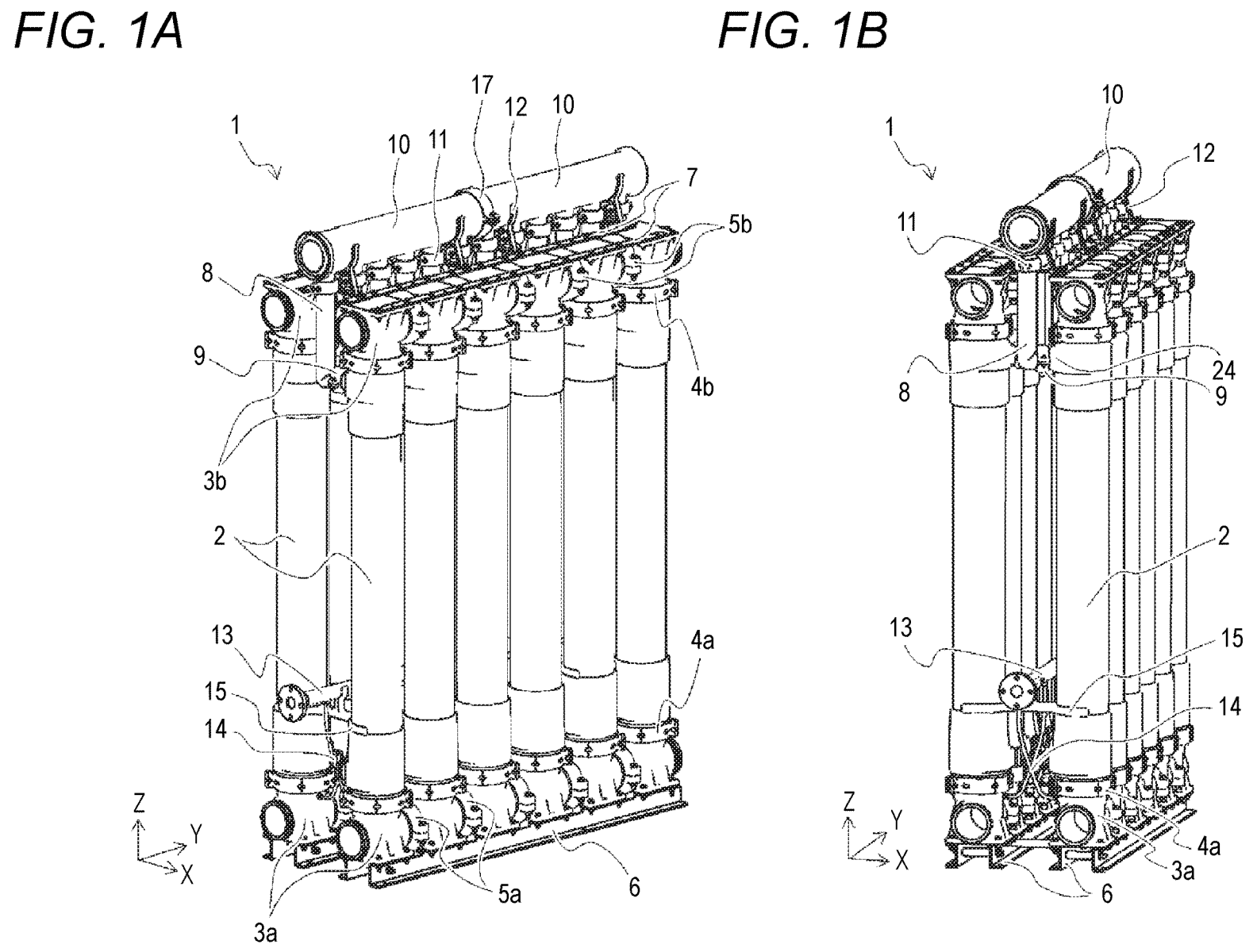

One embodiment of a hollow fiber membrane module unit 1 according to the present invention will be described with reference to a schematic perspective view illustrated in FIG. 1A and a schematic perspective view illustrated in FIG. 1B. The hollow fiber membrane module unit 1 according to the present invention has a configuration in which a plurality of hollow fiber membrane elements 2 are arranged in two rows. A T-shaped header pipe cap 3a is attached to one end portion of the hollow fiber membrane element 2 by an element joint 4a. A T-shaped header pipe cap 3b is attached to the other end portion of the hollow fiber membrane element 2 by an element joint 4b. The header pipe caps 3a adjacent in the same row are connected to each other by a header pipe cap joint 5a. Similarly, the header pipe caps 3b are connected to each other by a header pipe cap joint 5b. Some of the plurality of header pipe caps 3a in one row are fastened to a pedestal 6 by bolts or the like. Meanwhile, some of the plurality of header pipe caps 3b in one row are fastened to the support bar 7 by bolts or the like.

A side nozzle 24 on a side surface of the hollow fiber membrane element 2 is connected to, by a side nozzle joint 9, one end of a long elbow 8 bent at 90°. At this time, the other end portion of the long elbow 8 is attached in a manner of opening parallel to an end portion of the hollow fiber membrane element in a longitudinal direction on the header pipe cap 3b side. That is, the other end portion of the long elbow 8 is attached in a manner of opening in a positive direction in a Z-axis direction. In addition, the other end portion of the long elbow 8 is connected to, by a long elbow joint 11, a manifold 10 including a plurality of branch portions on an outer peripheral surface of a straight pipe. The manifold 10 is arranged above an upper portion in the Z-axis direction between the header pipe caps 3b arranged in two rows in a manner of being parallel to the rows. At this time, the manifold 10 is fitted and attached on a manifold base 12 which is fastened to the support bar 7 by bolts or the like and is attached in a manner of straddling the two rows.

A straight pipe-shaped air pipe 13 is arranged between the hollow fiber membrane elements 2 arranged in two rows. An outer peripheral surface of the air pipe 13 is provided with the same number of through holes as the header pipe cap 3a to be connected. Each of the through holes is connected to an air injection through hole 33 (see FIG. 3) provided in the header pipe cap 3a via an air tube 14. At this time, the air pipe 13 is fitted and attached on an air pipe base 15 fitted and attached in a manner of straddling the hollow fiber membrane elements 2 arranged in two rows.

Here, any joint can be selected for the element joint 4a and 4b as long as the element joint 4a and 4b can connect the hollow fiber membrane element 2 and an end portion 32 of a branch portion of the header pipe cap 3a and 3b (see FIG. 3) in a liquid-tight manner together with a seal member (not illustrated) such as an O-ring or a gasket. Among those, it is preferable to use a V-band coupling from a viewpoint of fastening the hollow fiber membrane element 2 and the header pipe caps 3a, 3b in contact with each other in an axial direction, and preventing rattling of a fastening portion and damage associated therewith. Although a material for the element joint 4a and 4b can be freely selected according to a use situation and a required strength, SUS304 and SUS316 are preferable from viewpoints of pressure resistance and corrosion resistance.

Any joint can be selected for the side nozzle joint 9 and the long elbow joint 11 as long as the side nozzle joint 9 and the long elbow joint 11 can connect the long elbow 8 and the hollow fiber membrane element 2 or the manifold 10 in a liquid-tight manner together with a seal member (not illustrated). Among those, it is preferable to use a side seal connection in which a connection length is changeable from a viewpoint of allowing an assembly error caused by a dimension error of the hollow fiber membrane element 2 and the header pipe cap 3a, and preferable examples include a groove joint connection, a victaulic joint connection (registered trademark), and a straub coupling (registered trademark) connection. Although a material for the side nozzle joint 9 and the long elbow joint 11 can be freely selected according to a use situation and a required strength, glass fiber reinforced plastic is preferable from viewpoints of pressure resistance, cost, weight, and moldability.

The pedestal 6 may have any shape as long as the pedestal 6 includes a base surface on which the header pipe cap 3a can be attached and a bolt through hole, and may be appropriately provided with an anchor bolt through hole or the like used for fixing the pedestal 6 to a floor surface, a foundation, or the like. Six hollow fiber membrane elements in one row are stacked on one pedestal 6 in FIG. 1A and FIG. 1B, but according to a required number of hollow fiber membrane elements 2, a shape of the pedestal 6 may be appropriately changed and the number of stacked hollow fiber membrane elements 2 may be freely selected. As illustrated in FIG. 1A and FIG. 1B, one pedestal 6 may be used for one row of the hollow fiber membrane elements, or one pedestal 6 may be used for two rows.

A shape and a material can be freely selected for the long elbow 8 as long as the long elbow 8 can connect the hollow fiber membrane element 2 and the manifold 10. For example, a metal pipe, a plastic pipe, a flexible hose, or the like are exemplified as a candidate. Among those, the plastic pipe is preferable from a viewpoint that the hollow fiber membrane element 2 and the manifold 10 are rigidly connected, the cost is low, and the weight is light. Specifically, polyvinyl chloride (PVC) is particularly preferable as the material from a viewpoint of durability.

Here, one embodiment of the hollow fiber membrane element 2 used in the present invention will be described with reference to a schematic cross-sectional view illustrated in FIG. 2. The hollow fiber membrane element 2 includes a hollow fiber membrane bundle including a plurality of hollow fiber membranes 21 and a cylindrical container 22 enclosing the hollow fiber membrane bundle. Both end portions of the hollow fiber membrane bundle and the cylindrical container 22 are connected and fixed by pottings 23a and 23b in a liquid-tight manner, respectively. The potting 23a has a through hole in its longitudinal direction. In the potting 23a, an end portion of the hollow fiber membrane 21 is embedded and sealed in the potting 23a. Meanwhile, the potting 23b is produced in a manner that an end portion of the hollow fiber membrane 21 is open at an end portion 26 of the hollow fiber membrane element 2 on a permeate side. The side nozzle 24 is provided on a side surface of the cylindrical container 22 on a potting 23b side in the longitudinal direction. In a case of external pressure type filtration in which filtration is performed from an outer peripheral surface of the hollow fiber membrane toward an inner circumferential direction, the hollow fiber membrane element 2 introduces a pressurized raw liquid from the through hole of the potting 23*a* positioned on an end portion 25 on a raw liquid side, and discharges a permeate filtered by the hollow fiber membrane 21 from the end portion 26 of the potting 23*b*. Meanwhile, a concentrate that is not filtered, cleaning air, and the like are discharged from the side nozzle 24.

Figure 3:
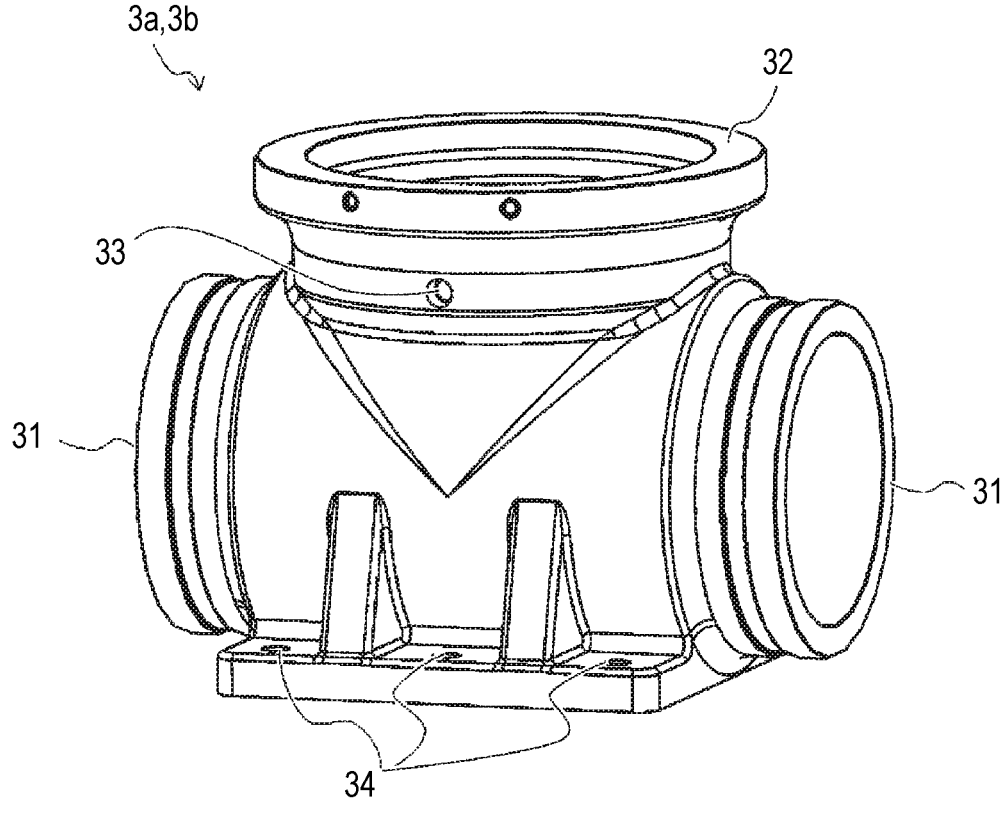
FIG. 3 is a schematic perspective view illustrating one embodiment of a header pipe cap used in the present invention.

Here, one embodiment of the header pipe caps 3*a* and 3*b* used in the present invention will be described with reference to a schematic perspective view illustrated in FIG. 3. The header pipe caps 3*a* and 3*b* each are T-shaped, and open in three directions of end portions 31 of a straight pipe portion and the end portion 32 of the branch portion. One air injection through hole 33 is separately provided on a side surface of the header pipe cap 3*a*. The air injection through hole 33 may be appropriately processed such as screw thread to be easily connected to the air tube 14. An end portion opposite to the end portion 32 of the branch portion of each of the header pipe caps 3*a* and 3*b* has a flat shape. The end portion on the opposite side is provided with bolt holes 34, and by using these holes, the header pipe cap 3*a* and 3*b* can be fastened to the pedestal 6 and the support bar 7 by bolts or the like. It is preferable to use plastic as a material for the header pipe cap 3*a* and 3*b* from a viewpoint that a complicated shape of the header pipe cap 3*a* and 3*b* can be produced by injection molding, the cost is low, and the weight is light. Among those. PVC is particularly preferable from viewpoints of durability, weather resistance, and strength.

Figures 4A, 4B:
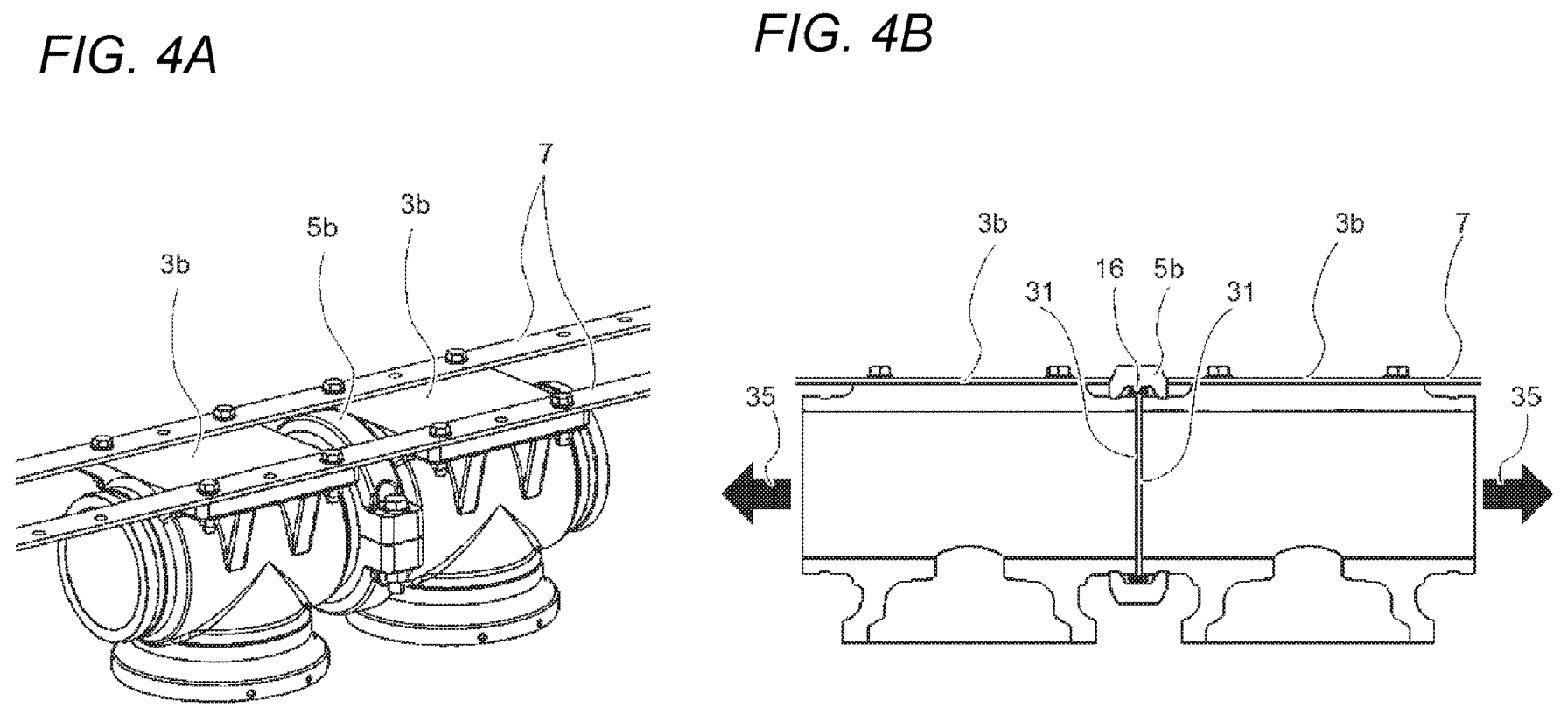

Here, one embodiment of a method for connecting the header pipe caps used in the present invention will be described with reference to a schematic perspective view illustrated in FIG. 4A and a schematic cross-sectional view illustrated in FIG. 4B. In FIG. 4A and FIG. 4B, the header pipe cap 3*b* is described as an example, but the header pipe cap 3*a* can be similarly described. The adjacent header pipe caps 3*b* are arranged in a manner that the end portion 31 of the straight pipe portion faces each other, and the header pipe cap joint 5*b* is attached to connect the header pipe caps 3*b* in a manner of covering an outer periphery of a contact surface. It is necessary to attach a rubber ring 16 which is a seal member for ensuring liquid tightness between the header pipe cap 3*b* and the header pipe cap joint 5*b*. The header pipe cap joint 5*b* uses a side seal connection in which the connection length is changeable from the viewpoint of allowing an assembly error caused by a dimension error of the hollow fiber membrane element 2, the header pipe cap 3*b*, or the like. That is, as illustrated in FIG. 4B, when the side seal connection is used, the connection can be performed even when there is a gap between the end portions 31 of the straight pipe portions of the adjacent header pipe caps 3*b*, and thus if the gap is within a range of a connectable distance, an increase or decrease in the gap distance caused by the assembly error is allowable.

Here, the side seal connection refers to a housing type connection in which seal is performed in a manner of covering an outer periphery of a contact surface of connection pipes, as represented by a victaulic joint (registered trademark) manufactured by victaulic Company. Examples of the connection type include a groove type having a groove in a pipe, a shoulder type including a convex portion, a ring type, and a straub coupling (registered trademark). Among those, the side seal connection used in the present invention is preferably a groove type connection in which a groove is provided in the outer peripheral portion of the connection portion of the header pipe caps since the groove type connection is excellent in easiness of moldability and cost of the header pipe caps to be connected and wide in an allowable range of an assembly length and an angle. Although a material for the header pipe cap joint 5*b* can be freely selected according to a use situation and a required strength, glass fiber reinforced plastic is preferable from viewpoints of pressure resistance, cost, weight, and moldability.

However, in a case in which only the side seal connection is used, the header pipe cap 3*b* displaces in a longitudinal direction of the straight pipe portion (directions illustrated by arrows 35 in the figure) due to a load caused by a pressure or a liquid flow during operation of the hollow fiber membrane module unit. That is, a load acts and moves in a direction in which the header pipe caps 3*b* are separated from each other and a gap is widened. When the header pipe cap 3*b* moves in this manner, the header pipe cap 3*b* itself, the hollow fiber membrane element 2 or other members connected to the header pipe cap 3*b* may be deformed and damaged.

The hollow fiber membrane module unit 1 according to the present invention can prevent the displacement and deformation of the header pipe cap 3*b* by using the support bar 7 while ensuring easiness of assembly by using the side seal connection. Specifically, the support bar 7 is attached along the flat surface of the header pipe cap 3*b* opposite to the end portion 32 of the branch portion in a manner of straddling the adjacent header pipe caps 3*b*. Then, by using the bolt hole 34, the header pipe cap 3*b* and the support bar 7 are fastened with bolts or the like. Accordingly, the adjacent header pipe caps 3*b* can be rigidly connected to each other via the support bar 7, and the displacement in the directions of the arrows 35 (movement directions of the header pipe cap) can be prevented.

At this time, among the header pipe caps forming a row, at least the header pipe caps at both ends need to be fastened to the support bar 7. Meanwhile, regarding the fastening of the support bar and the header pipe caps excluding the header pipe caps at both ends, a fastening position may be determined as appropriate in consideration of a size, ease of assembly, and cost of the hollow fiber membrane module, and it is preferable that all the header pipe caps are fastened to the support bar 7 from a viewpoint of preventing damage. That is, the adjacent header pipe caps are preferably connected to each other by the side seal connection covering the outer periphery of the contact surface and a connection implemented by the support bar.

In FIG. 4A, the support bar 7 has a length that straddles the plurality of header pipe caps 3*b*, but the length of the support bar 7 is not limited as long as the displacement of the header pipe cap 3*b* can be prevented. It is sufficient that a fastening state in which displacement can be prevented can be realized, and for example, the support bar 7 may be provided for each coupling portion of the adjacent header pipe caps 3*b*. The number, shape, and arrangement position of the support bars 7 can be freely selected as long as the number, shape, and arrangement position are within a range in which the displacement and deformation of the header pipe cap 3*b* and leakage of the connection portion can be prevented.

FIG. 4A illustrates a configuration in which two support bars 7 are arranged at both end portions, perpendicular to the longitudinal direction of the straight pipe portion, of the flat surface of an upper portion of the header pipe cap 3*b*. From the viewpoint of preventing the displacement of the header pipe cap 3*b* and preventing the leakage of the connection portion, as illustrated in FIG. 1A, the support bar 7 is preferably positioned on an opposite side of the hollow fiber membrane element 2 via the header pipe cap 3b.

From the same viewpoint, it is preferable to attach a plurality of the support bars 7, and it is preferable to attach the support bars 7 in two rows to the header pipe cap. In this case, it is preferable that the attachment is made uniform in a circumferential direction of the connection portion.

If two support bars 7 are arranged at both end portions of the flat surface of the upper portion of the header pipe cap 3b as illustrated in FIG. 4A, it is possible to use the one support bar 7 as the base surface of the manifold base 12 while ensuring the effect of preventing the displacement of the header pipe cap 3b and preventing the leakage of the connection portion, and thus such a structure is preferable. In addition, with such a structure, the support bar 7 can have a simple shape of a prism as illustrated in FIG. 4A, and thus such a structure is preferable from viewpoints of cost, handleability, and easiness of assembly. As illustrated in FIG. 4A and FIG. 4B, if the support bar 7 and the header pipe cap 3b are brought into direct contact with each other and fastened, the displacement can be prevented by a frictional force therebetween, which is preferable.

A material for the support bar 7 can be freely selected according to a use situation or a required strength, such as metal, plastic, or fiber reinforced plastic, but carbon steel or carbon fiber reinforced plastic is preferable from viewpoints of strength and creep resistance, stainless steel is preferable from a viewpoint of corrosion resistance, and carbon fiber reinforced plastic is preferable from a viewpoint of light weight.

FIG. 4A and FIG. 4B illustrate a method for fixing the header pipe cap 3b by using the support bar 7, but for fixing the header pipe cap 3a, the pedestal 6 works in the same manner as the support bar 7, and the same effect can be achieved.

Here, flows of fluids during various operations performed by the hollow fiber membrane module unit 1 according to the present invention will be described with reference to FIGS. 5 to 7 by using arrows 40.

First, one implementation method of filtration performed by the hollow fiber membrane module unit 1 according to the present invention will be described with reference to a schematic diagram illustrated in FIG. 5. A raw liquid introduced from the end portion 31 of the straight pipe portion of the header pipe cap 3a at a farthest end portion flows through the straight pipe portion of the header pipe cap 3a which is connected and communicated, and a part of the raw liquid branches and flows into the hollow fiber membrane element 2 from the end portion 25 of the hollow fiber membrane element 2 on the raw liquid side. The raw liquid flowed into the hollow fiber membrane element 2 is totally filtered from the outer peripheral surface of the hollow fiber membrane 21 toward the inner circumference. At this time, impurities adhere to an outer peripheral membrane surface, and a permeate is discharged from the end portion 26 on the permeate side into the header pipe cap 3b. The permeate flowed into each header pipe cap 3b is collected in the straight pipe portion of the header pipe cap 3b which is connected and communicated, flows toward the header pipe cap 3b at a farthest end portion, and is discharged from the end portion.

When performing dead end filtration, a flow channel connected to the side nozzle 24 (not illustrated) of the hollow fiber membrane element 2 is sealed without being used.

Figure 5:
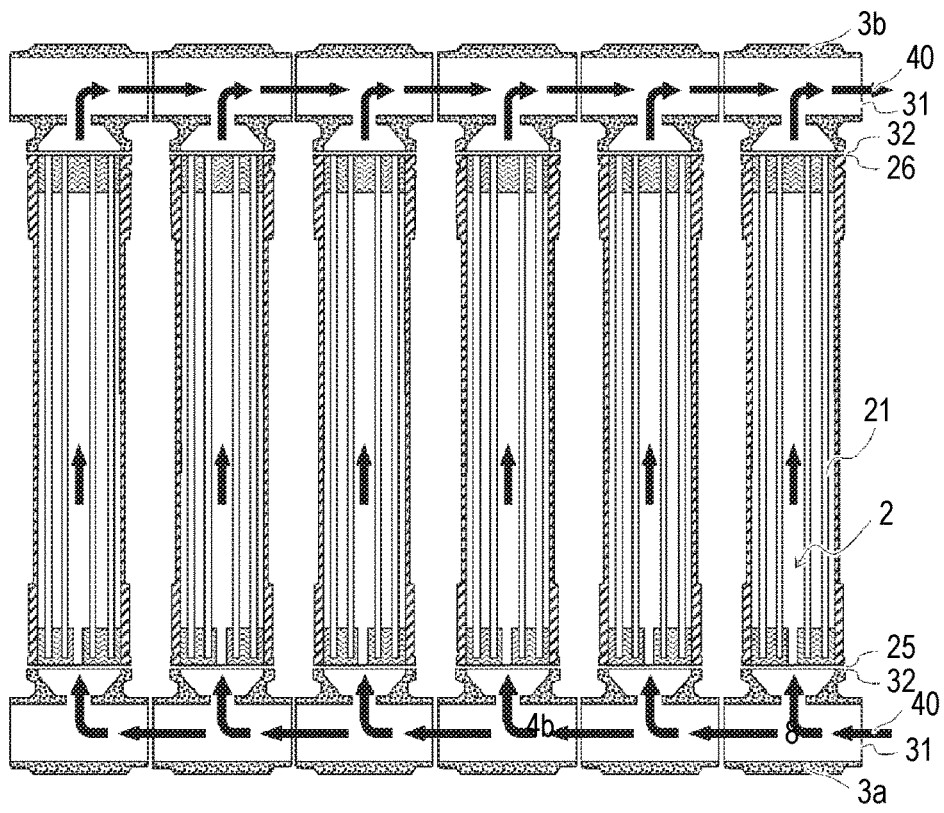
FIG. 5 is a schematic of fluid flow illustrating one implementation method of filtration performed by the hollow fiber membrane module unit according to the present invention.

In FIG. 5, the flow is illustrated by illustrating six hollow fiber membrane elements in one row, but in an actual operation, filtration may be performed in two rows respectively, and the number of hollow fiber membrane elements may be freely selected by changing a coupling number according to a required processing amount.

FIG. 5 illustrates a flow of introducing the raw liquid from one end of the header pipe cap 3a and discharging the permeate from one end of the header pipe cap 3b, and in this case, liquid tightness may be maintained by attaching a lid or the like on the other ends of the header pipe caps 3a and 3b. It is also possible to appropriately introduce the raw liquid from both ends of the header pipe cap or discharge the permeate from both ends of the header pipe cap in consideration of fitting with an external pipe (not illustrated). Regarding the connection between the header pipe caps 3a and 3b and the external pipe, a header pipe cap joint (that is, a side seal connection) may be used similarly to the connection between the header pipe caps, or the connection may be implemented after converting a side seal connection portion into a flange, and a connection method may be appropriately selected according to a situation of the external pipe.

Next, one implementation method of backwashing performed by the hollow fiber membrane module unit 1 according to the present invention will be described with reference to a schematic diagram illustrated in FIG. 6. In the backwashing, the permeate obtained in the operation illustrated in FIG. 5 is used as a cleaning liquid, and the cleaning liquid is introduced from the end portion of the header pipe cap 3b at a farthest end portion. The introduced cleaning liquid flows through the straight pipe portion of the header pipe cap 3b which is connected and communicated, and a part of the introduced cleaning liquid branches and flows into the hollow fiber membrane element 2. The cleaning liquid flowed into the hollow fiber membrane element 2 is transmitted from an inner peripheral surface of the hollow fiber membrane 21 toward the outer periphery. At this time, the cleaning liquid is discharged to the outside of the hollow fiber membrane 21 while removing the impurities adhering to the outer peripheral membrane surface. The cleaning liquid containing the impurities and discharged to the outside of the hollow fiber membrane 21 flows from the side nozzle 24 of the hollow fiber membrane element 2 to the long elbow 8 and the manifold 10, is collected in the manifold 10 which is connected and communicated, and is discharged from an end portion of the manifold 10 at a farthest end portion. When performing the backwashing, a flow channel connected to the header pipe cap 3a is sealed without being used.

Figure 6:
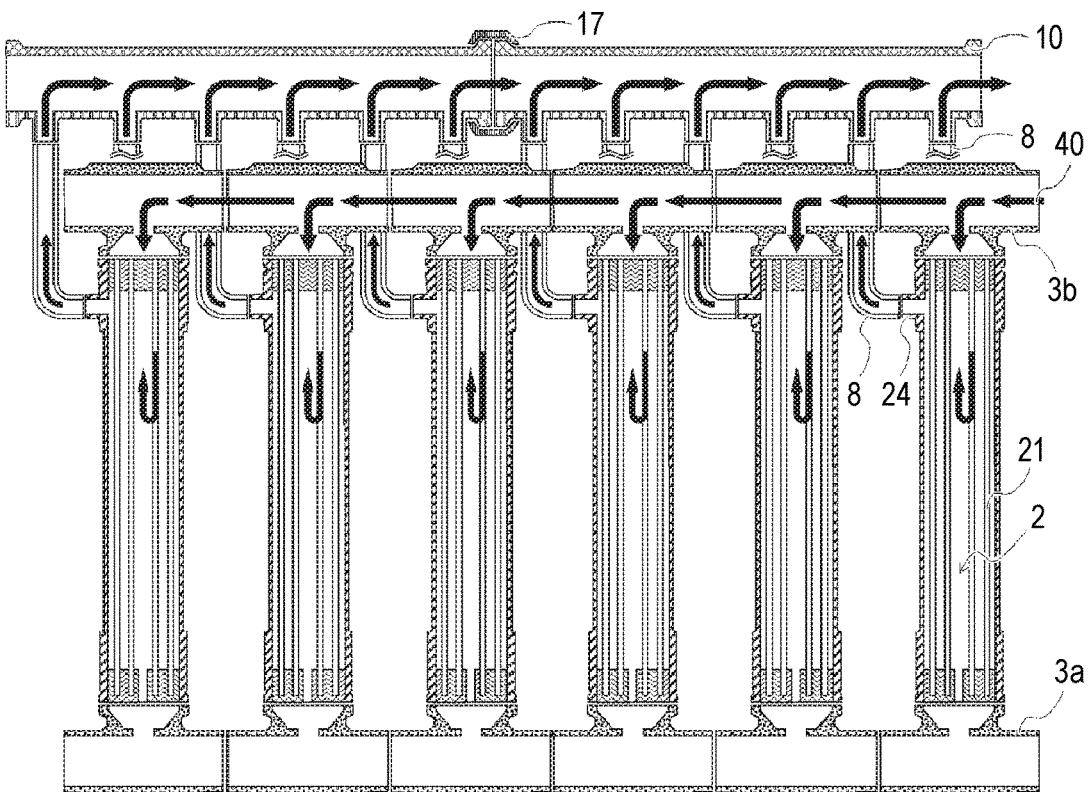
FIG. 6 is a schematic of fluid flow illustrating one implementation method of backwashing performed by the hollow fiber membrane module unit according to the present invention.

FIG. 6 illustrates a flow of introducing the cleaning liquid from one end of the header pipe cap 3b and discharging the cleaning liquid from one end of the manifold 10, and in this case, liquid tightness may be maintained by attaching a lid or the like on the other end of the header pipe cap 3b or the manifold 10. It is also possible to appropriately introduce the cleaning liquid from both ends of the header pipe cap 3b or discharge the cleaning liquid from both ends of the manifold 10 in consideration of fitting with an external pipe (not illustrated).

The cleaning liquid not only from one row of the hollow fiber membrane elements illustrated in figure but also from another row flows into the manifold 10, and the cleaning liquid from two rows of the hollow fiber membrane elements is collected in and discharged from the manifold 10. In FIG. 6, the manifold 10 has a branching number and a length with which six hollow fiber membrane elements (three hollow fiber membrane elements×2 rows) can be connected, but the branching number can be appropriately selected according to a required number of the hollow fiber membrane elements and ease of assembly. However, the branching number of the manifold 10 is preferably four to eight (two to four×2 rows) in consideration of a range in which the weight of the manifold itself can be handled manually, the number of connection positions between the manifolds, and the required number of the manifold bases 12.

Connection between the manifolds 10 is implemented by a manifold joint 17. Any joint can be selected for the manifold joint 17 as long as the manifold joint 17 can connect the manifolds 10 in a liquid-tight manner together with a seal member (not illustrated) such as an O-ring or a gasket, and it is preferable to use a V-band coupling from a viewpoint of fastening the manifolds 10 in contact with each other in an axial direction, and preventing rattling of a fastening portion and damage associated therewith. Although a material for the manifold joint 17 can also be freely selected according to a use situation and a required strength, SUS304 and SUS316 are preferable from viewpoints of pressure resistance and corrosion resistance.

Finally, one implementation method of air washing performed by the hollow fiber membrane module unit 1 according to the present invention will be described with reference to a schematic diagram illustrated in FIG. 7. In order to perform the air washing, first, the inside of the hollow fiber membrane element 2 is filled with the raw liquid or the permeate, and then air is introduced therein. The air introduced from an end portion of the air pipe 13 flows in the air pipe 13, and a part of the air branches into a plurality of holes provided on a side surface of a cylindrical portion, passes through the air tube 14, and flows into the header pipe cap 3a from the air injection through hole 33. The air flowed into the header pipe cap 3a flows into the hollow fiber membrane element 2 from the branch portion of the header pipe cap 3a. The air flowed into the hollow fiber membrane element 2 rises along the outer peripheral surface of the hollow fiber membrane 21, flows while removing the impurities adhering to the membrane surface, passes through the side nozzle 24, the long elbow 8, and the manifold 10, is collected in the manifold 10 that is connected and communicates, and is discharged from an end portion of the manifold 10 at a farthest end portion. When performing the air washing, a flow channel connected to the end portion 31 of the straight pipe portion of the header pipe cap 3a or 3b is sealed without being used.

Figure 7:
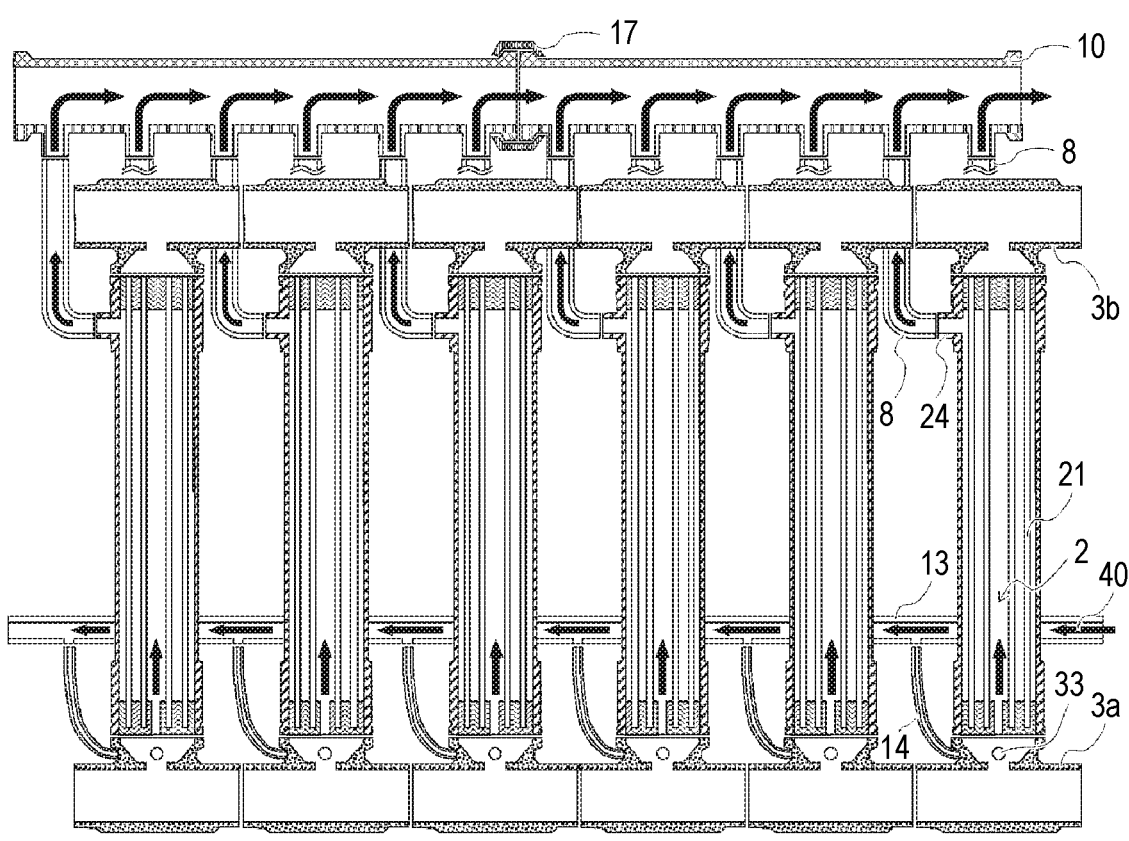
FIG. 7 is a schematic of fluid flow illustrating one implementation method of air washing performed by the hollow fiber membrane module unit according to the present invention.

As described above, the flows of the fluids during operations performed by the hollow fiber membrane module unit 1 according to the present invention is described by referring to FIGS. 5 to 7, but FIGS. 5 to 7 are diagrams for easy understanding of the flows, and do not exactly illustrate the orientation and the positional relationship of actual members. Regarding the orientation, arrangement, and fitting of the actual members, see FIG. 1A and FIG. 1B.

Figure 8:
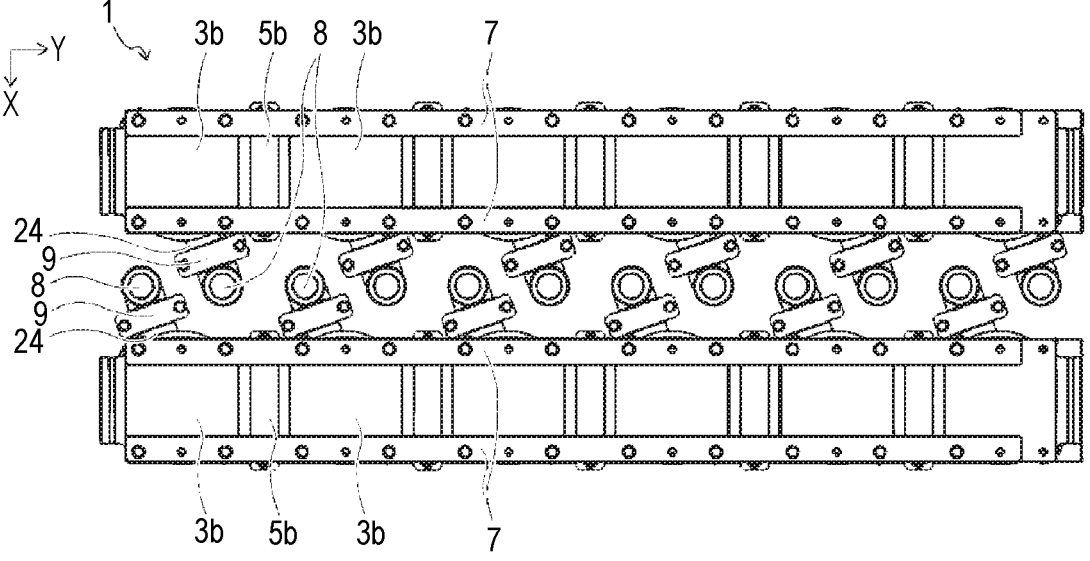
FIG. 8 is a schematic top view illustrating one embodiment of an arrangement of side nozzles of the hollow fiber membrane element used in the present invention.

Here, one embodiment of an arrangement of the side nozzle 24 of the hollow fiber membrane element 2 used in the present invention will be described with reference to a schematic top view illustrated in FIG. 8. The side nozzles 24 provided in the hollow fiber membrane elements 2 arranged in two rows in the present invention are arranged between the rows in order to be connected to the manifold 10. At this time, it is preferable that the side nozzles 24 paired in two rows are not arranged in a manner of facing each other, but are arranged in a manner of being shifted from each other as illustrated in the figure. This is because the long elbow 8 connected to the side nozzle 24 via the side nozzle joint 9 can be efficiently arranged in the gap between the two rows, and such an arrangement is preferable from a viewpoint of space saving. According to a membrane diameter and a module size, by adopting such a configuration, an installation efficiency (a membrane area per module attachment unit area) can be increased to about 625 m$^2$/m$^2$ which is two times or more as compared with a case in which the side nozzles 24 are attached in a manner of facing each other. Such a configuration allows the branch portions of the manifold 10 connected to the long elbow 8 to be arranged at equal intervals, and thus is preferable from viewpoints of water passing property and ease of assembly.

INDUSTRIAL APPLICABILITY

According to the present invention, it is possible to provide a hollow fiber membrane module unit capable of allowing a dimension error of each member constituting the hollow fiber membrane module unit, and preventing displacement and deformation acting on the header pipe cap while ensuring ease of assembly.

Although the present invention has been described in detail with reference to specific embodiments, it is apparent to those skilled in the art that various changes and modifications can be made without departing from the spirit and the scope of the present invention.

The present application is based on the Japanese patent application (JP2021-134671A) filed on Aug. 20, 2021, and the contents thereof are incorporated herein by reference.

REFERENCE SIGNS LIST

1: hollow fiber membrane module unit
2: hollow fiber membrane element
3a, 3b: header pipe cap
4a, 4b: element joint
5a, 5b: header pipe cap joint
6: pedestal
7: support bar
8: long elbow
9: side nozzle joint
10: manifold
11: long elbow joint
12: manifold base
13: air pipe
14: air tube
15: air pipe base
16: rubber ring
17: manifold joint
21: hollow fiber membrane
22: cylindrical container
23a, 23b: potting
24: side nozzle
25: end portion of hollow fiber membrane element on raw liquid side
26: end portion of hollow fiber membrane element on permeate side
31: end portion of straight pipe portion of header pipe cap
32: end portion of branch portion of header pipe cap
33: air injection through hole
34: bolt hole
35: arrow
40: arrow

The invention claimed is:

1. A hollow fiber membrane module unit comprising a plurality of hollow fiber membrane elements to which header pipe caps are attached at both end portions, the hollow fiber membrane elements being arranged in parallel to form a row, wherein

US 12,564,814 B2

11 a plurality of the header pipe caps attached to the end portions of the hollow fiber membrane elements on a raw liquid side are fixed to a pedestal, and adjacent header pipe caps attached to the end portions of the hollow fiber membrane elements on the raw liquid side are connected to each other, adjacent header pipe caps attached to the end portions of the hollow fiber membrane elements on a permeate side are connected by a side seal connection covering an outer periphery of a contact surface between the adjacent header pipe caps, wherein each of the adjacent header pipe caps on the permeate side has an upper part and a lower part, wherein the lower parts of the adjacent header pipe caps are attached to the hollow fiber membrane elements, the header pipe caps attached to the end portions on the permeate side at least at both ends of the row are fixed by a support bar, wherein the support bar is a separate structural member from the pedestal, wherein a longitudinal direction of the support bar is the same as a direction of connection of the header pipe caps, wherein the support bar is positioned on the upper part of each header pipe cap and on an opposite side of the hollow fiber membrane elements via the header pipe caps, said side seal connection includes a header pipe cap joint and a rubber ring, said side seal connection traverses from the contact surface of one header pipe cap to the other contact surface of the adjacent header pipe cap, thereby joining said header pipe caps, said rubber ring is in between the header pipe cap and the header pipe cap joint, the number of the hollow fiber membrane elements in said row is three or more, each of the hollow fiber membrane elements has a side nozzle on a side surface thereof, and said side nozzles are paired in two rows, wherein the side nozzles adjacent to each other in one of the two rows are shifted in the same orientation, the size nozzles adjacent to each other in the second of the two rows are shifted in the same orientation, and the side nozzles in one row are arranged in a manner of being shifted from each other in orientation with respect to the side nozzles in the second row.

2. The hollow fiber membrane module unit according to claim 1, wherein

12 the adjacent header pipe caps attached to the end portions of the hollow fiber membrane elements on the permeate side are connected by the side seal connection covering the outer periphery of the contact surface and a connection by the support bar, and wherein the support bar is fixed to each header pipe cap by a bolt.

3. The hollow fiber membrane module unit according to claim 1, wherein the adjacent header pipe caps attached to the end portions of the hollow fiber membrane elements on the raw liquid side are connected by the side seal connection covering an outer periphery of a contact surface between the adjacent header pipe caps and a connection by the pedestal.

4. The hollow fiber membrane module unit according to claim 1, wherein the side seal connection is a groove type connection in which a groove is provided in an outer peripheral portion of a connection portion of the adjacent header pipe caps.

5. The hollow fiber membrane module unit according to claim 1, wherein the support bar is attached in two rows to the header pipe caps.

6. The hollow fiber membrane module unit according to claim 1, wherein a manifold base is attached to the support bar in a manner of straddling two rows.

7. The hollow fiber membrane module unit according to claim 6, wherein a manifold is attached on the manifold base and is connected to the side nozzle via a long elbow, and the side nozzles paired in two rows are arranged in a manner of being shifted from each other to allow a branch portion of the manifold connected to the long elbow to be arranged at equal intervals.

8. The hollow fiber membrane module unit according to claim 1, wherein the hollow fiber membrane elements being arranged in parallel to form the row, and other hollow fiber membrane elements being arranged in parallel to form a second row, wherein the number of the hollow fiber membrane elements in the second row are the same as the number in the first row, and the hollow fiber membrane elements in the first row are in the same position as the hollow fiber membrane elements in the second row in the longitudinal direction.

* * * * *